United States Patent
Petrea et al.

(10) Patent No.: US 6,481,153 B1
(45) Date of Patent: Nov. 19, 2002

(54) TURF ADDITIVE FORMULATION FOR REDUCTION OF LOCALIZED DRY SPOTS DUE TO WATER REPELLENCY

(75) Inventors: Randy D. Petrea, Spartanburg, SC (US); Bruce H. Suddeth, Lyman, SC (US); Shirley A. Whiteside, Chesnee, SC (US); Christopher A. Byrd, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/008,203

(22) Filed: Dec. 6, 2001

(51) Int. Cl.$^7$ ............................................. A01G 1/04
(52) U.S. Cl. ......................................................... 47/1.01
(58) Field of Search ...................... 47/1.01 R; 504/351, 504/353; 71/903

(56) References Cited

U.S. PATENT DOCUMENTS

| | | | | |
|---|---|---|---|---|
| 2,822,643 A | * | 2/1958 | Witt et al. | 435/103 |
| 2,826,002 A | * | 3/1958 | Novak et al. | 435/103 |
| 5,595,957 A | | 1/1997 | Bowey et al. | 504/118 |
| 5,731,268 A | * | 3/1998 | Taguchi et al. | 47/DIG. 10 |
| 5,921,023 A | | 7/1999 | Ogawa et al. | 47/58.1 |
| 6,051,317 A | * | 4/2000 | Brueggemann et al. | 239/34 |
| 6,090,896 A | | 7/2000 | Jahnke et al. | 525/404 |

\* cited by examiner

*Primary Examiner*—Robert P. Swiatek
*Assistant Examiner*—Bethany L Griles
(74) *Attorney, Agent, or Firm*—Terry T. Moyer; William S. Parks

(57) ABSTRACT

Certain novel formulations of turf additives that act in such a manner as to permit proper amounts of moisture to contact root systems in order to reduce dry spots within highly managed turf areas and/or lawns. It is theorized that the accumulation of humic acid (and other natural byproduct deleterious compounds) at the topsoil surface in most cultivated grassy areas including sandy soils (such as, in particular, golf greens, pastures, lawns, and the like), as well as other non-grassy sandy areas in which such humic acid accumulation poses water repellency problems (such as beaches), results in the production of an effective organic waxy coating on the soil and/or sand components. Such a coating is hydrophobic in nature and thus dries out the soil itself. The inventive formulation thus permits removal of such accumulated humic acid (and other compounds) from the topsoil to the level necessary to provide effective moisture penetration for sustained grass growth therein (hereinafter referred to as "redistributes"). Methods of providing such beneficial removal of humic substances from target sandy soils are also contemplated within this invention, as well as specific test hydrophobic sand formulations.

11 Claims, No Drawings

TURF ADDITIVE FORMULATION FOR REDUCTION OF LOCALIZED DRY SPOTS DUE TO WATER REPELLENCY

FIELD OF THE INVENTION

This invention relates to certain novel formulations of turf additives that act in such a manner as to permit proper amounts of moisture to contact root systems in order to reduce dry spots within highly managed turf areas and/or lawns. It is theorized that the accumulation of humic acid (and other natural byproduct deleterious compounds) at the topsoil surface in most cultivated grassy areas including sandy soils (such as, in particular, golf greens, pastures, lawns, and the like), as well as other non-grassy sandy areas in which such humic acid accumulation poses water repellency problems (such as beaches), results in the production of an effective organic waxy coating on the soil and/or sand components. Such a coating is hydrophobic in nature and thus dries out the soil itself. The inventive formulation thus permits removal of such accumulated humic acid (and other compounds) from the topsoil to the level necessary to provide effective moisture penetration for sustained grass growth therein (hereinafter referred to as "redistributes"). Methods of providing such beneficial removal of humic substances from target sandy soils are also contemplated within this invention, as well as specific test hydrophobic sand formulations.

DISCUSSION OF THE PRIOR ART

Localized dry spots are a distinct problem within highly managed turf areas and/or lawns, in particular those with sandy soils, primarily for aesthetic reasons. Such dry spots are the result of the development of areas of varying degrees of water repellency within and at the surface of the target soil. Plant water usage is critical to sustained plant growth; however, the existence of such localized dry spots creates a problem with nonuniformity of water supply to treated grasses over time. Basically, in times of high stress and/or easy water evaporation (e.g., higher temperatures, low humidity), such water repellency areas will exhibit higher water loss than others. As a result, the plant life present within the target lawn or green will not receive uniform, and, at times, vastly different levels of, water supply. As time passes, the difference in the amount of water supplied to discrete areas of the target lawn or green may become more disparate. Thus, the possibility for localized dry spots to materialize within sandy soils is relatively high over a sustained length of time (e.g., from 6 to 18 months on average from genesis to being empirically noticed), and, again, most times the existence of such dry spots is unknown to the lawn or green caretaker until materialization (since the presence of such water repellency areas may exist anywhere within the topsoil, from the surface to as low as about 2 inches below, the area of greatest concentration of grass root systems).

Also, hydrophobicity of sand creates certain problems with regard to pooling water after raining (as one example) which in turn causes unsightly areas either within highly sandy yards, ballparks, or beaches, or to provide water penetration in dry sandy conditions in order to possibly sustain plant-life therein (such as arid desert-like areas). Reduction in such water repellency would thus be helpful in maintaining, at least, better aesthetics for such sandy areas, as well as the possibility for permitting or promoting the growth of sustained plant life in such dry, barren areas.

Without intending to be bound to any particular scientific theory, it is believed that such water repellency areas within sandy soils are the result of the presence of humic substances and their attachment to soil components, particularly in large accumulations at the topsoil surface. Humus is degraded plant and animal matter (by microbial organisms) and is basically the organic portion of soil that comprises the necessary nutrients to sustain plant growth and life therein. One byproduct of such humus (again produced through a naturally occurring process within the soil) is humic acid (simply the acidic form of humus, basically a mix of various different materials). Humic acid and other like substances, although necessary for the sustenance of plant life as it provides the aforementioned nutrients to root systems, unfortunately also appears to create problems within sandy soils, most particularly the creation of a waxy organic, water-repellent coating upon binding to and with soil components (for instance, and without limitation, sand). If such a coating is permitted to accumulate over a long period of time, such as the aforementioned 6 to 18 month period, and particularly at the topsoil surface, the coating becomes highly water repellent in nature and uniform plant water use is difficult to achieve, as mentioned previously. In theory, and, again, without intending to be bound to such theory, it is believed that such a coating is formed by the amphiphylic humic acid (or other like humic substance) adhering, by its hydrophilic portion, to the hydrophilic sites within the sandy soil, permitting the highly hydrophobic ends to extend (similar in nature to a micelle). Such a coating is thus hydrophobic in nature and, when present as a thorough coating over such surface portions, again, tends to either drive water away or facilitate water loss by preventing moisture from passing through to the subterranean roots of any plants therein. If the water remains at the surface, evaporation is also facilitated as it cannot easily penetrate within the soil. Such a problem exists, as noted above, not only within greens, but also within lawns and pastures (as merely some examples of such trouble areas). In order to provide a uniform appearance in lawns and greens, it has been a requirement either to water consistently in very large amounts (which is wasteful and possibly damaging to the plants themselves) or to water selected trouble areas by hand on a continuous basis (which is labor-intensive and possibly wasteful in terms of water consumption). Furthermore, it is generally too late to know of trouble water repellent areas within such lawns or greens until they become apparent empirically. For pastures, pools of water develop sporadically on occasion due to this problem; the standard method of remedying this problem is to dig up the earth and wait for the humic substances to be consumed as nutrients (over a relatively long period of time) by the root systems therein. Such a procedure thus leaves an aesthetically displeasing result and is not always reliable for reducing water repellency therein. Thus, it has been found that there exists a need to provide a simple method and/or formulation for reducing such a humic acid water repellency effect at the soil surface without creating detrimental effects to the surface plant life.

In the past, the best methods of reducing the amount and presence of localized dry spots have basically involved the introduction of certain surfactants to the soil for the transport of water through the surface coating, preferably in tandem with compounds that decrease the surface tension of the waxy coating to permit penetration of the active surfactant components themselves in U.S. Pat. No. 5,921,023 to Ogawa et al., U.S. Pat. No. 5,595,957 to Bowey et al., and U.S. Pat. No. 5,731,268 to Taguchi et al. Such a method has been problematic to a certain extent due to the cost associated with some silicon-based surfactants, biodegradability issues of most viable surfactants, as well as foaming problems when water is present, and/or the difficulty in removal of degraded coating components after surfactant treatment. Also, this specific surfactant-only treatment does not remove the waxy coating to an appreciable degree from the target topsoil surface.

Another manner of reducing such dry spot problems has been increasing watering itself. However, such a method is labor intensive and, in many areas where water is not plentiful, use for aesthetic purposes (e.g., lawns, greens, and the like), is preferably kept at a minimum as compared to other more important purposes (e.g., drinking water). Such an issue also contributes to the aforementioned development of water repellency areas over long periods of time because of the inability of the caretaker to continuously supply moisture to target lawns, greens, etc., to the levels needed to best ensure uniformity of watering is accomplished. Other possible attempts at alleviating such a problem exist, albeit as an aim at removing contaminants (e.g., oils, fuels, etc.) from the target soils for improving plant growth therein (U.S. Pat. No. 6,090,896 to Jahnke et al. and WO01/26832 to Lubrizol Corporation). Such a method does not provide the same degree humic substance removal, however, needed to provide the reliability of treatment for localized dry spot reduction. Also, another option has been the tearing up of the topsoil itself to physically breakdown the humic acid accumulation. Unfortunately, such a procedure is also labor intensive and invariably disturbs the plant life to too great an extent in order to properly manage uniform growth of target plants and grasses. Furthermore, once the plant life has begun to grow in such a scenario, humic acid begins to accumulate anyway, such that unless physically altering the topsoil is undertaken, the same problem of plant life loss (and thus the development of dry spots within the lawn or garden) would result without further effective moisture penetration. Thus, there remains a need for a simplified, chemical remedy to this waxy coating of humic acid (and other like substances) within lawns, greens, and the like. To date, other than those specific procedures noted above, such a remedy has not been provided with the aim at reducing such unwanted humic substance topsoil surface accumulation in order to provide sustained uniform water supply over the entire target green and/or lawn. Further previous attempts at remedying such localized dry spot water repellency problems include treatment of golf greens with sodium hydroxide. Such a treatment does in fact remove the hydrophobic coating; however, it is also highly phytotoxic to grass and thus is an unacceptable method from a commercial perspective.

DESCRIPTION OF THE INVENTION

It is thus an object of the invention to provide an improved method of lowering topsoil surface tension by chemically reacting (or possibly complexing) with the hydrophobic portion of such humic acid coatings, thereby permitting moisture to penetrate such a coating and not only pass to the root systems of target plants therein but also possibly transporting the surface-accumulated humic substances into the soil for root consumption of the nutrients provided by such substances. A simple, safe formulation permitting such a method is also an object of this invention. Additionally, a test hydrophobic sand formulation is also an object of this invention in order to permit reliable laboratory analysis of the effectiveness of certain formulations to provide the aforementioned desired reaction with hydrophobic portions of humic acid coatings.

Accordingly, this invention concerns a soil additive formulation and/or method of treating sandy areas, soils, or areas including both sand and soil (such as lawns, greens, pastures, beaches, dry desert-like areas, and the like), wherein said soil additive formulation is non-phytotoxic and exhibits a humic acid removal capacity under the hydrophobic sand humic acid removal test of at least 150 ppm. Such a formulation comprises, preferably, at least one humic acid redistribution compound selected from the group consisting of at least one $C_{2-60}$ (or possibly higher) alkyl, alkenyl, and/or alkaryl succinic anhydride or acid (the anhydride will convert to its acid form upon dissolution in water) monocation or di-cation salt resulting from the reaction with either a metal or amine functional neutralization salt, at least one $C_{4-60}$ (or possibly higher) branched or unbranched diacid mono- or di-cation salt resulting from the reaction with either a metal or amine functional neutralization salt, at least one polycarboxylic acid derivative salt, and any mixtures thereof, and from 0–99% by weight of at least one compound that actively lowers the surface tension of humic acid waxy coatings from hydrophobic sand particles. Such a formulation may also comprise a copolymer exhibiting both hydrophilic and hydrophobic portions for reaction with the hydrophobic portions of such hydrophobic sand particles in order to further provide hydrophilic extensions therefrom to facilitate the reaction between the bound humic acid and the aforementioned humic acid removal compound. Furthermore, an inventive synthetic hydrophobic sand formulation exhibiting a penetration period of at least 9 seconds for a drop of 2 molar ethanol under a minimal ethanol drop test is also encompassed within this invention. Lastly, a method for reducing localized dry spot formation within lawns or greens comprising the application of a soil additive formulation to a target lawn or green, wherein said soil additive formulation exhibits a humic acid removal capacity under certain conditions of at least 150 ppm from a sample of the aforementioned synthetic hydrophobic sand formulation is additionally encompassed by this invention. Again, to date, nothing within the pertinent prior art teaches or fairly suggests such specific inventions.

Such a composition and method of treating sandy areas may thus be utilized for the redistribution of humic substances in sandy areas alone. In such a manner, the sandy area (a beach, for example) may be modified to permit water penetration therein, to prevent unsightly water pools, for example, after raining, or to dry desert-like areas in order to permit water penetration to sustain root systems of plant-life which would not grow otherwise.

The term "synthetic" as it applies to the inventive hydrophobic sand above, is intended to indicate that such sand is manipulated via a synthetic route to provide such a high level of hydrophobicity through chemical treatment of sand itself. It is not intended to mean a sand formulation that has been produced in total by hand. Of course, sand, being silicon dioxide, is available naturally, but it generally exhibits very low, if any hydrophobicity levels. Thus, the term "synthetic" is, again, intended to show that the hydrophobic properties thereof are chemically provided by hand and not in nature.

The inventive formulation may either be applied in liquid form, pellet form, or granular form to the selected treated area.

The inventive formulation, in terms of composition, thus requires at least one humic substance (in particular, humic acid) redistribution compound. In effect, such a compound or mix of compounds reacts with the hydrophobic portions of the humic acid (the portion of the humic acid not attached to the hydrophilic sand and/or soil particles) present at the target topsoil surface. Upon binding thereto, the redistribution compound provides sites for strong water adhesion. Such adhered water droplets will be pulled into the sand and/or soil by further adhesion by other particles or through cohesion with other water droplets). The binding energy of the water droplets to the redistribution compound is greater than that of the humic acid to the sand and/or soil, thereby permitting release of the humic acid for transport into the target soil for consumption as nutrients by the root systems of the plants therein. Thus, the humic acid redistribution is effectuated sufficiently to allow for greater amounts of moisture to penetrate the topsoil as well as effectively permitting transport of humic substance nutrients to the target roots, all for increased plant growth and reduction of water repellent areas.

Such a humic acid redistribution compound may be of any type that provides the above-discussed humic acid redistribution and transport via water movement. Preferably, and without limitation, such a redistribution compound may be chosen from three different classes of salts or weak polymeric acids, namely succinic anhydride (or acid) mono- and di-cation salts resulting from reactions with a metal or amine functional neutralization salt, such as hydroxy, alkoxy or $C_1$–$C_{60}$ alkyl, alkenyl, and/or alkylaryl succinic acid mono- and di-cation salts resulting from reaction with a metal or amine functional neutralization salt; $C_4$–$C_{60}$ branched or unbranched diacid salts, and polycarboxylic acid derivative salts.

Non-limiting, preferred compounds for this purpose include alkenyl succinic anhydride di-cation salts, in particular such compounds as octenyl succinic anhydride and tetrapropenyl succininc anhydride di potassium salts, available from Milliken & Company under the tradenames SYN-FAC® 8515 and SYNFAC® 8510, respectively. Examples of non-limiting preferred diacid salts within this invention include potassium sebacate, potassium adipate, and other dicarboxylic acid mono-metal, di-metal, or amine functional mono- or di-cation salts including such basic compounds as oxalic, malonic, succinic, glutaric, tartaric acid, and malic acids, having metal or amine counter ions of any corresponding valence metal or neutralizing amine, such as, without limitation, Na, Li, K, Mg, Ca, monoethanolamine, diethanolamine, triethanolamine, ammonia, and/or monoalkyl, dialkyl, and/or trialkyl amines. Such a compound (or compounds) is one that can be easily prepared by those skilled in the art by neutralizing a selected dicarboxylic acid with a selected base to form the desired salt or amine. Examples of preferred, non-limiting, polycarboxylic acid salts include solutions of maleic copolymer salts, water soluble polymeric polyelectrolytes, and other sodium salt-based anionic polymers, available from Milliken & Company under the tradename INVIGORATE® (a formulation previously utilized for the purpose of agglomerating fine soil particles into larger particles thus creating greater pore space therebetween as well to agglomerate clay or organic fines). Each of these classes of humic acid redistribution compounds provides the requisite humic acid removal and transport discussed previously. As noted below, such compounds effectively remove such unwanted topsoil substances from synthetic hydrophobic sand and thus are effective as compounds utilized by themselves for such purpose when applied to target lawns and/or greens (as one preferred embodiment). The humic acid redistribution compound may thus be comprised of all of the soil (and/or turf) additive formulation, but such a formulation preferably comprises from 1–99% by weight of such a redistribution compound;

more preferably from about 10–90% by weight; more preferably from about 15–75% by weight. For the succinic anhydride-type salts, the amount may be even more preferably from about 50–75% by weight of the formulation, still more preferably from about 60–72%, and most preferably between about 65–72%. For the maleic copolymer alternative compounds, the amount may be even more preferably from about 10–25% by weight of the entire formulation, still more preferably from about 12–20%, and most preferably between about 17–19%. In such an instance, however, a large amount of the maleic copolymer-containing formulation will be water, from about 40–60% by weight, more preferably from about 40–50%, in order to permit uniform dispersion for effective application to the target lawn and/or green.

However, in order to best ensure initial penetration of such removal compounds within the target topsoil areas (which may or may not be thoroughly coated with humic substance waxy coatings), it is preferable to include at least one compound within the formulation for the lowering of the surface tension at the topsoil surface which is also compatible with the aforementioned required humic acid removal compound. Such a compound can be an alkoxylated (preferably ethoxylated) alcohol (surfactant), such as a branched or unbranched $C_6$–$C_{60}$ alcohol alkoxylate (preferably, again, ethoxylate) (for utilization with the aforementioned succinic anhydride salts and long-chain acid salts), or alkoxylated (preferably ethoxylated) $C_8$–$C_{40}$ fatty acid (for utilization in combination with the aforementioned maleic copolymer-containing formulations). Such compounds may be branched or unbranched in configuration. Examples of preferred types of alcohol alkoxylates for this purpose include $C_{6-60}$ alkyl, alkenyl or alkylaryl EO/PO surfactants, linear or branched, and secondary or primary hydroxyl in type, including mixtures of surfactants comprising from 99 to 1% by weight of at least one surfactant selected from polyalkylene oxide compounds with the general formula:

$$R_3-O-(C_2H_4O)_c(C_3H_6O)_dR_3$$

wherein c is 0 to 500; d is 0 to 500, and $R_3$ is H, or an alkyl group with 1 to 4 carbon atoms; wherein the polyalkylene oxide has a molecular weight in the range of 300 to 51,000; and a second optional different surfactant comprising a compound of the general formula $$R_4-O(CH_2CH_2O)x(CHR_5CH_2O)yR_6$$

wherein x is from 1 to 50; y is 0–50: $R_4$ is a branched or linear alkyl, alkenyl, aryl or an aryl group optionally having an alkyl group substituent, the alkyl group having up to 60 carbon atoms; $R_5$ is selected from H and alkyl groups having from 1 to 2 carbon atoms; and $R_6$ is selected from H and alkyl groups having from 1 to 30 carbon atoms. Suitable secondary surfactants also include carboxylic and dicarboxylic esters of the general formula:

$$R_4CO_a(CH_2CH_2O)x(CHR_5CH_2O)yCO_bR_6$$

wherein x is from 1 to 50; y is 1–50, a is from 1 to 2, b is from 1 to 2: $R_4$ is an alkyl or alkenyl group having up to 60 carbons or an aryl group optionally having an alkyl group substituent, the alkyl group having up to 60 carbon atoms; $R_5$ is selected from H and alkyl groups having from 1 to 2 carbon atoms; and $R_6$ is selected from H and alkyl groups having from 1 to 30 carbon atoms.

The surface tension of such a surface-active compound (or compounds) should in effect be below the general level of such a humic substance waxy coating, thus less than about 30 dynes/m². As non-limiting examples for this purpose, tridecyl alcohol (8 EO), and coconut fatty acid (9 EO), are preferred. The amount of such a component within the inventive formulation is, as above, different for each type, depending on the type of humic acid removal compound present therein. Thus, for the succinic anhydride and long chain salt types, the amount of such an additive should range from about 1–20%, more preferably from about 5–15%, and most preferably from about 7–10%, all by weight of the entire formulation. For the remaining type of humic acid removal compounds, the amount of such an alkoxylated fatty acid ranges from about 1–25%, more preferably from about 10–20%, and most preferably from about 16–20%, all by weight of the entire formulation. Such an alkoxylated fatty acid is essentially required upon the presence of such maleic copolymer type components, if such a type of removal compound is actually present therein.

Another optional compound for introduction within the inventive formulation is a polyoxyalkylenated copolymer additive comprising at least two different alkylene oxide monomers, such as, without limitation, but preferably, ethylene oxide and propylene oxide, may be added, particularly with the highly preferred aforementioned succinic acid salts and/or long chain salts, for facilitation of the binding of the redistribution compounds to the target humic acid deposits through such copolymer groups. In essence, without intending on being bound to any scientific theory, it is believed that the more hydrophobic portions (propylene oxide, or PO, monomers, for example) bind to the hydrophobic ends of the humic acid, and the more hydrophilic portions (ethylene oxide, or EO, for example) bind readily to the salt removal compounds. In such a manner, the binding energy of the humic acid to the soil and/or sand is overcome by the pull of water droplets on the entire complex of salt-copolymer-humic acid such that transport to within the soil is accomplished and the humic acid can thus be more readily removed from the topsoil surface. Again, such a copolymer component is not necessary for proper functioning of the inventive formulation in every instance, although its presence may be desired in an effort to reduce the amount of humic acid removal compounds (which may be expensive or difficult to find in large quantities) within the soil (and/or turf) additive formulation and still provide an effective manner of reducing localized dry spots within the target lawn and/or green. Such a copolymer may thus be of any length and molecular weight with a preferred molecular weight of between 1000 and 5000, more preferably from about 2000 to about 3500, and most preferably from about 2750 to about 3250. Such a copolymer is available from BASF under the family of tradenames of PLURONIC®. If present, such copolymer should be present in an amount of from about 1 to about 85% by weight of the entire formulation, more preferably from about 20 to about 80%, and most preferably from about 55 to about 75%.

Such an inventive formulation is one example of a soil additive that provides the desired topsoil humic acid removal that is necessary to effectuate the reduction in dry spot formation within vegetative areas. As discussed above, the aim of this invention is to lower the surface tension of humic acid accumulations on topsoil by reacting with the hydrophobic extensions of such an acid coating. This result is analogous to certain laboratory analyses involving the removal of humic acid from a synthetic hydrophobic humic-acid coated sand formulation. In order to best develop and test the effectiveness of such a novel soil additive formulation, it was necessary to develop the aforementioned novel synthetic hydrophobic sand since no such sand is available commercially. As noted below in greater detail, the basic premise in producing such novel sand is to attach large amounts of humic acid thereto in order to provide a highly hydrophobic sand. Such a sand formulation can be utilized for more than just this analysis of humic acid removal, as low water uptake can help in terms of less water-laden sandbox components, better flowing hourglass sand, and countless other end-uses. For this invention, the humic acid-treated sand exhibits a very high hydrophobicity in terms of adding drops of various concentrations of ethanol to the target sand surface (when flattened as a level surface) and determining the molar concentration of methanol required to permit penetration of the ethanol into the sand itself within a ten second interval. Again, as measured below, such an inventive sand must exhibit a penetration time of at least 9 seconds for a drop (e.g., about 40 µL) of 2M ethanol (based on pure 200 proof ethanol). Upon producing this test sand, then, a proper laboratory analysis of the humic acid removal capability of the inventive soil additive formulation can be undertaken. Such a method of analyzing humic acid removal from such synthetic hydrophobic sand basically entails, for our purposes, the analyses of water-removed humic acid from hydrophobic (humic acid-coated) sand particles, as discussed in greater detail below.

The inventive formulations may include any other standard components for lawn, garden, or other vegetation treatment, including, further wetting agents, colorants (for aesthetic purposes or for application identification), perfumes, water, electrolytes, fertilizer, pesticides, and the like.

DESCRIPTION OF THE PREFERRED EMBODIMENT

Initially, the production of a suitable hydrophobic sand formulation was necessary to properly analyze the ability of the particular soil additive formulations for sufficient removal of humic acid coatings applied thereto. As noted above, such an hydrophobic sand formulation is novel as to its synthetic nature and its resultant reproducible hydrophobicity as measured by an ethanol drop test. Thus, such a novel hydrophobic sand formulation was produced and tested as follows:

First, humic acid sodium salt was converted to acid form by treating with a molar amount of 1N hydrochloric acid followed by coating target sand with such humic acid. Thus, humic acid sodium salt (purchased from Aldrich Chemical) was mixed with 1N hydrochloric acid (36% acid diluted with Deionized water). Using 1 liter of such 1N HCl, 100 grams of Humic Acid sodium salt was added and allowed to stir 16 hours. After stirring, the solution was filtered through a Whatman #2 filter paper and washed with excess deionized water three times to remove excess HCl. The residual humic acid was then dried in an 80° C. oven for 12 hours (or until dry). The resultant humic acid material was then ground with a mortar and pestle to a fine powder consistency.

Sand, a GA-45 washed top dressing sand for golf greens, available from Golf Agronomics, was then treated with such humic acid. Using 20 grams of the treated humic acid from above, it was combined with 250 grams reagent methanol and 250 grams deionized water. The solution was then agitated for two hours to insure full dissolution of the powder. Once dissolved, 500 grams of the sand was added thereto and the mixture was allowed to tumble for at least 4 hours to insure full coating by the humic acid. Subsequently, the sand was then filtered through Whatman #2 filter paper to remove excess solvents and then placed in an 80° C. oven to dry for at least 16 hours. The treated sand was then removed from the oven and washed 3 times with deionized water through a Whatman #2 filter. The filtered sand was then placed in the same oven for another 16 hours or until dry.

The sand was then characterized by a minimum ethanol drop method. First, ethanol standards were made for use in the MED(Minimum Ethanol Drop) test through the production of 1M, 2M, 3M, and 4M solutions of ethanol using absolute 200 proof ethanol. A 15 mm petri dish with one eighth of an inch of the test sand was used for the MED test. Ten drops of distilled water were placed on top of the test sand and a stopwatch was used to record the penetration time. After five minutes, the drops were removed. Ten drops of the one molar ethanol were then placed on the sand and timed (an average of two minutes and 10 seconds). Ten drops of the two molar ethanol were then tested in the same manner (an average of nine seconds). This test required that the drops that last an average of ten seconds be given the numerical value of the molar solution tested. Thus, the produced novel synthetic hydrophobic sand formulation exhibited a MED for 2M ethanol of at least 9 seconds.

Soil Additive Formulations

Soil additive formulations were then produced for measurement in terms of humic acid removal from this test novel synthetic hydrophobic sand (all percentages listed below are by weight of the entire formulation):

EXAMPLE 1

71.4 EO-PO Copolymer (MW~3100)
9.0 Tridecyl Alcohol 8 EO (SYNFAC® TDA-92)
19.6 TPSA Di Potassium salt (SYNFAC® 8510)

EXAMPLE 2

66.1 EO-PO Copolymer (MW~2900)
8.3 Tridecyl Alcohol 8 EO (SYNFAC® TDA-92)
25.6 TPSA Mono TEA salt (production method noted below)

EXAMPLE 3

18.5 INVIGORATE®
18.5 Coconut fatty acid 9EO (SYNLUBE® 6278)
18.5 TPSA Dipotassium salt (Syn Fac® 8515)
44.5 Water

EXAMPLE 4

100% Potassium sebacate
Such a salt was prepared through the following procedure:
432 grams of distilled water, 100 grams of Sebacic Acid (available from Arizona Chemical) and 112 grams of 45% KOH (available through Brenntag Southeast distributors) was added to a 1000 ml three neck round bottom flask. The flask was purged with nitrogen and heated to 80–90° C. and held for 2 hours. The acid value of the resulting product was 0.28 mg KOH/gram of sample.

EXAMPLE 5

50 INVIGORATE®
50 Water

EXAMPLE 6

100 SYNFAC® 8510 (TPSA Dipotassium Salt)

EXAMPLE 7

100% TPSA Mono-TEA Salt
Such a salt was produced through the following method:
569.6 grams of distilled water, 271.6 grams of tetrapropenyl succinic anhydride (available from Milliken Chemical) and 190.7 grams of 99% Triethanolamine (available through Brenntag Southeast distributors) was added to a 1000 ml three neck round bottom flask. The flask was purged with nitrogen and heated to 80–90° C. and held for 2 hours. The completion of the reaction was monitored by IR analysis.

EXAMPLE 8

100% TPSA Di-TEA Salt
Such a salt was produced through the following method:
500 grams of distilled water, 271 grams of tetrapropenyl succinic anhydride (available from Milliken Chemical) and 300 grams of 99% Triethanolamine (available through Brenntag Southeast distributors) was added to a 1000 ml three neck round bottom flask. The flask was purged with nitrogen and heated to 80–90° C. and held for 2 hours. The completion of the reaction was monitored by IR analysis.

EXAMPLE 9

100% fully neutralized n-octenyl succinic anhydride sulfanilic sodium salt
Such a neutralized salt was prepared in accordance with the following procedure:
Within a pyrex beaker equipped with a stirrer are 59.6 parts (0.282 moles) of n-octenyl succinic anhydride, 55.1 parts (0.282 moles) of a sodium salt of sulfanilic acid and 80 parts water were mixed together with gentle stirring over 30 minutes at 70° C., and subsequently increased to 85° C. for another 30 minutes. A beige waxy solid was obtained The completion of the reaction was monitored by IR analysis. Then 10 grams of solid was dissolved in 90 grams of water and the pH was determined to be 3.46. This product was the comparative example listed below utilized within the humic acid redistribution test.

To another 10 gram sample of this product was added 1.70 grams of 45% KOH dissolved in 90 grams of water and the resulting pH was determined to be 6.97. This neutralized inventive product was then utilized within the humic acid redistribution test.

These examples, plus the comparatives listed below, were all tested in terms of humic acid removal from the aforementioned test sand. A higher number of ppm removed in the table, below, indicates better wettability and thus moisture penetration to alleviate dry spot localization within lawns, gardens, and the like. The removal procedure was as follows:

Initially, a calibrated stock solution measurement curve for humic acid itself was generated for comparison purposes with tested humic acid removal samples. Thus, a 5000 ppm Humic Acid (purchased from Fluka Chemika) stock solution was prepared by dissolving 0.5 grams of Humic acid in 100 milliliters of water. Further standard solutions were prepared by serial dilution of the 5000 ppm sandard stock solution. The absorbance of each solution was measured at 620 nm on a Beckman Model DU 650 Spectrophotometer and a plot of absorbance versus concentration provided the Humic Humic Acid Calibration Table

| Ppm Humic Acid | Absorbance @ 620 nm |
| --- | --- |
| 0 | 0 |
| 100 | 0.1303 |
| 500 | 0.6371 |
| 1000 | 1.2667 |
| 1500 | 1.9189 |

The Examples, listed above, both inventive and comparative, were then each individually diluted with water (42 parts water:1 part example formulation). Two milliliters of each diluted example was then placed into the open end of a 19 inch clear plastic tube containing 3 grams of the above specific humic acid coated sand. One end was then plugged by a two-layer cheese cloth square of 1.5×1.5 cm and then the tube was situated vertically with the plugged end lower. The solutions were allowed to pass through the sand and were collected after passing through the plug. The sand was then placed in an oven at 60° C. for 24 hours to remove any residual moisture. The sand (3 grams) was again packed into a 19 inch clear plastic tube plugged at one end with the cheese cloth plug. Ten ml of distilled water was then passed through the sand and collected. The absorbance at 620 nm of the distilled water sample was then measured and compared to the humic acid calibration curve (from the Table, above) to determine the amount of humic acid removed from the coated sand. This test is, for the context of this invention, is the definition of "hydrophobic sand humic acid removal test". The removal results were as follows:

TABLE

Removal of Humic acid from Sand

| Product | ppm Removed |
| --- | --- |
| Water (Control) | 0.24 |
| Cascade ®[1] (Comparative) | 17.16 |
| Primer 604[2] (Comparative) | 26.73 |
| Example 1 | 152.23 |
| Example 2 | 200.84 |
| Example 3 | 922.49 |
| Example 4 | 789.78 |
| Example 5 | 353.70 |
| Example 6 | 837.52 |
| Example 7 | 872.40 |
| Example 8 | 246.46 |
| Example 9 | 1015.15 |
| Silwet ® L-77 (Comparative) | 94.62 |
| Pluronic ® L-62 Copolymer plus 10% Silwet ® L-77[3] (Comparative) | 43.74 |
| Polyoxyalkylenated Amine reacted DDSA[4] (Comparative) | 38.25 |
| OSA sulfanilic unneutralized salt[5] | 27.04 |

[1]Cascade ®-Competitive sample from Precision Labs
[2]Primer 604-competitive sample from Aquatrols
[3]As taught within U.S. Pat. No. 5,595,957
[4]As taught within U.S. Pat. No. 6,090,896
[5]As taught within WO01/26832

Thus, the inventive formulations clearly showed extremely good removal (redistribution) of very high levels of humic acid from the sample hydrophobic sand.

There are, of course, many alternative embodiments and modifications of the present invention which are intended to be included within the spirit and scope of the following claims.

What we claim is:

1. A soil additive formulation comprising from at least one humic acid redistribution compound selected from the group consisting of at least one hydroxy, alkoxy or $C_{1-60}$ alkyl, alkenyl, or alkaryl succinic acid or anhydride mono- or di-cation salt resulting from reaction with a metal or amine functional neutralization salt, at least one $C_{4-60}$ branched or unbranched diacid mono- or di-cation salt resulting from reaction with a metal or amine functional neutralization salt, at least one polycarboxylic acid derivative salt, and any mixtures thereof, and at least one compound that actively lowers the surface tension of humic acid waxy coatings from hydrophobic sand particles, wherein said compound is a copolymer component exhibiting both hydrophilic and hydrophobic monomers.

2. The formulation of claim 1 wherein said formulation is present in liquid form, pellet form, or granular form.

3. The formulation of claim 2 wherein said at least one compound that actively lowers the surface tension of humic acid waxy coatings from hydrophobic sand particles is a copolymer component exhibiting both hydrophilic and hydrophobic monomers.

4. The formulation of claim 2 wherein said humic acid redistribution compound is a neutralized alkenyl succinic acid mono-cation salt.

5. The formulation of claim 2 wherein said humic acid redistribution compound is a neutralized alkenyl succinic acid di-cation salt.

6. The formulation of claim 2 wherein said humic acid redistribution compound is a polycarboxylic acid derivative salt.

7. The formulation of claim 6 wherein said polycarboxylic acid derivative salt is a maleic acid polymer salt.

8. The formulation of claim 1 wherein said humic acid redistribution compound is a neutralized alkenyl succinic acid mono-cation salt.

9. The formulation of claim 1 wherein said humic acid redistribution compound is a neutralized alkenyl succinic acid di-cation salt.

10. The formulation of claim 1 wherein said humic acid redistribution compound is a polycarboxylic acid derivative salt.

11. The formulation of claim 10 wherein said polycarboxylic acid derivative salt is a maleic acid polymer salt.

* * * * *